United States Patent
Das et al.

(10) Patent No.: US 7,433,984 B2
(45) Date of Patent: Oct. 7, 2008

(54) TIME-BASED WEIGHTED ROUND ROBIN ARBITER

(75) Inventors: Sumit Das, Richardson, TX (US); Kevin Main, Plano, TX (US); Roy D. Wojciechowski, Round Rock, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/965,035

(22) Filed: Oct. 13, 2004

(65) Prior Publication Data

US 2006/0080487 A1     Apr. 13, 2006

(51) Int. Cl.
*G06F 13/36* (2006.01)

(52) U.S. Cl. .................. 710/117; 710/241

(58) Field of Classification Search .......... 710/107, 710/111, 113, 117, 124, 306, 309, 311, 314, 710/315, 240–244
See application file for complete search history.

(56) References Cited

U.S. PATENT DOCUMENTS

| | | | |
|---|---|---|---|
| 5,502,824 A * | 3/1996 | Heil | 710/113 |
| 5,621,898 A | 4/1997 | Wooten | |
| 5,758,105 A | 5/1998 | Kelley et al. | |
| 5,845,096 A * | 12/1998 | Munguia et al. | 710/113 |
| 5,933,648 A * | 8/1999 | Landolf et al. | 710/240 |
| 5,951,667 A | 9/1999 | Abramson | |
| 5,987,555 A | 11/1999 | Alzien et al. | |
| 6,205,524 B1 * | 3/2001 | Ng | 711/151 |
| 6,446,151 B1 * | 9/2002 | Fischer et al. | 710/124 |
| 6,449,672 B1 * | 9/2002 | O'Connor et al. | 710/107 |
| 6,594,718 B1 * | 7/2003 | Ebner et al. | 710/240 |
| 6,801,971 B1 | 10/2004 | Devine et al. | |
| 7,000,059 B2 * | 2/2006 | Liu | 710/309 |
| 2003/0097509 A1 * | 5/2003 | Fry et al. | 710/305 |
| 2005/0038947 A1 * | 2/2005 | Lueck et al. | 710/315 |

OTHER PUBLICATIONS

PCI Specification, Rev. 2.1, pp. 56-84, Jun. 1995.*
Plug and Play/PCI <http://www.unics.uni-hannover.de/gaertner.juergen/wd719x/Linux/Docu/PnPPCI.html>, Jan. 18, 1997.*

* cited by examiner

*Primary Examiner*—Khanh Dang
(74) *Attorney, Agent, or Firm*—William B. Kempler; W. James Brady, III; Frederick J. Telecky, Jr.

(57) ABSTRACT

A PCI bus time-based weighted round robin arbiter has a phase table divided into a plurality of phases. Each of the phases is assigned to one of the ports on the PCI bus. An arbiter state machine is coupled to the phase table and looks at the port assignment for the next plurality of phases, for example, 3 phases. If the arbiter determines that the next plurality of phases is assigned to a single port, that port is selected as the next bus master.

17 Claims, 3 Drawing Sheets

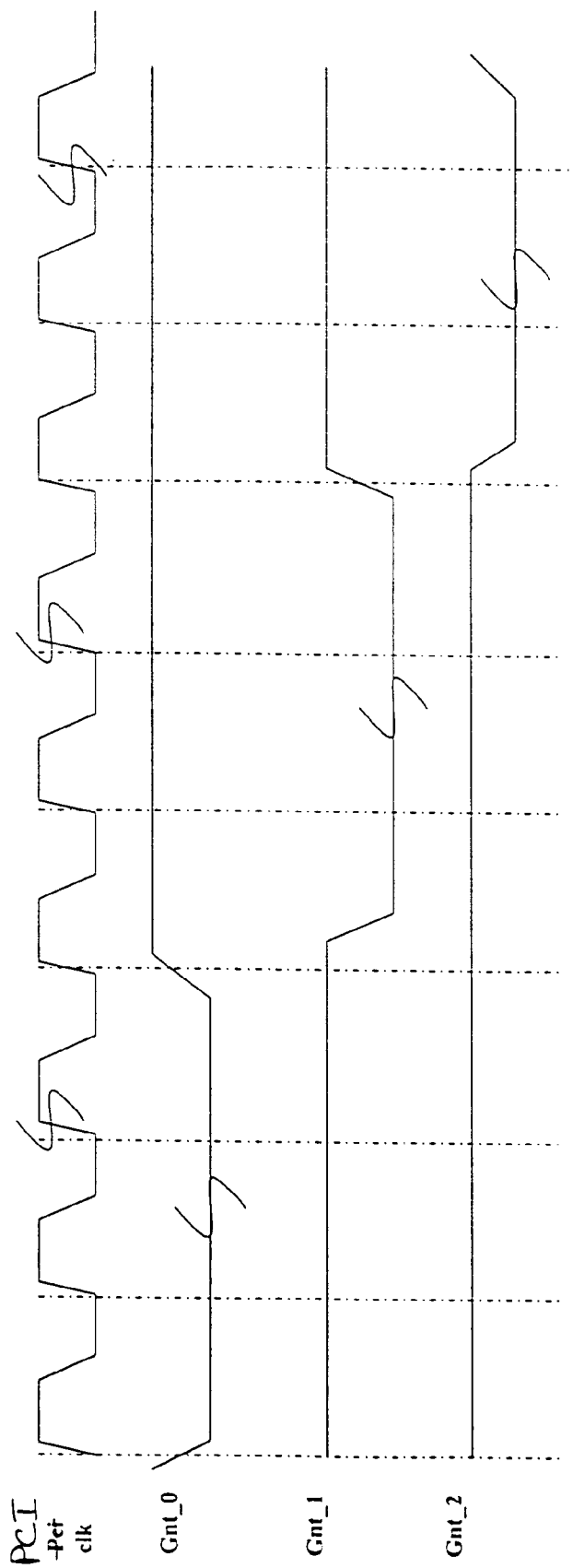

TIME-BASED WEIGHTED ROUND ROBIN ARBITER

FIELD OF THE INVENTION

This invention relates to time-based weighted round robin arbiter and more specifically to an arbiter for a PCI Express to PCI bridge which can support isochronous traffic.

BACKGROUND OF THE INVENTION

Peripheral Component Interconnect (PCI) is a parallel bus architecture developed in 1992 which has become the predominant local bus for personal computers and similar platforms. The implementation of this technology has come close to its practical limits of performance and can not easily be scaled up in frequency or down in voltage. A new architecture utilizing point-to-point transmission, having a higher speed, and which is scalable for future improvements, is known as PCI Express.

One advantage of PCI Express is the ability to transfer isochronous data. The new IEEE Standard Dictionary of Electrical and Electronics Terms, fifth addition, defines "isochronous" as the time characteristic of an event or signal recurring at known, periodic time intervals. In terms of the architecture, transmission of isochronous data requires that the bus have a guaranteed minimum bandwidth and maximum latency in order to maintain the isochrony of the data. Video data is isochronous data because it is necessary that the frames of data arrive at a time certain or the data has no value.

A PCI Express to PCI bridge will allow PCI devices to be connected to a PCI bus in a PCI Express architecture. In a PCI bus architecture, the bus arbiter utilizes a round-robin arbitration which is "fair " to all devices on the bus. Once the device on the bus has received a grant to use the bus, it can hold on to the bus until its transaction is complete or until 4 kilobytes of data has been transferred, so that isochrony can not be guaranteed.

FIG. 1 shows a block diagram of a computer system 100 implementing a standard PCI Express to PCI bridge 112. The bridge is coupled by lines 108 to the PCI Express fabric (a network of interconnected devices and switches) 106, which is coupled by line 104 to CPU 102. The PCI Express fabric is also coupled via lines 110 to other devices (not shown). The PCI bus 114 is connected to the bridge and to two PCI applications 116, 120 respectively. Each of the applications has request/grant lines 118 and 122 respectively. PCI application 120 is isochronous and is connected via line 124 to an isochronous fabric, such as an IEEE 1394 device. Because of the way a PCI architecture operates, interfering traffic from the other PCI application will have equal priority and interfere with the isochronous transmission of data from the PCI application 120.

Accordingly, there is a need for a PCI bus arbiter that can provide for isochronous data transmission even though the PCI bus does not support this feature.

SUMMARY OF THE INVENTION

A general object of the present invention is to provide a PCI bus arbiter that allows the PCI bus to provide isochronous data transmission.

This and other objects and features are provided, in accordance with one aspect of the present invention by a PCI bus time-based weighted round robin arbiter comprising a phase table comprising a plurality of phases, each of the phases being assigned to a port on a PCI bus. An arbiter state machine is coupled to the phase table for looking at a plurality of phases at a time. The arbiter state machine selects the next bus master to use the PCI bus when a predetermined number of phases have been assigned to a single port.

Another aspect of the invention includes an arbiter means in a PCI bus arbiter for guaranteeing a predetermined time for transmitting isochronous data comprising means for dividing a time cycle into a predetermined number of phases, each of the phases being assigned to a port on a PCI bus. An arbiter state machine is responsive to the means for dividing for granting the use of the PCI bus to a selected port.

A further aspect of the invention comprises a method of operating a PCI bus including providing a time-based arbiter for assigning each device on the bus a predetermined time also in which to perform bus transactions. Terminating a bus transaction in order to guarantee isochrony of data being transferred for one of the devices on the bus.

BRIEF DESCRIPTION OF THE DRAWINGS

FIG. 3 illustrates the operation of the state machine of the of FIG. 2 in issuing grant signals to devices on the PCI bus.

DETAILED DESCRIPTION

The PCI bus is a synchronous bus architecture in which all data transfers are performed relative to a system clock, such as the signal PCI CLK shown in FIG. 3. Initially, the PCI bus operated at a maximum clock speed of 33 MHz, which was later revised to support operation at 66 MHz. The PCI standard implements a 32-bit multiplex address and data bus which allows a reduced pin count to reduce the cost and size for PCI components. A PCI bus cycle is initiated by driving an address onto the 32-bit bus during a first clock edge which is called the address phase. This address phase is signified by the assertion of a FRAME # signal. One or more data phases begin at the next clock edge in which data is transferred over the bus.

All PCI devices are in parallel on this 32-bit bus. The device which initiates a data transfer is called the initiator or bus master and the device which receives the data is the target, which is a bus slave. Since all PCI devices which are capable of initiating a data transfer are bus masters, they can take control of the bus to perform a data transfer without requiring the assistance of the CPU. This means that the bus itself must contain a control circuit to resolve conflicts when two or more devices want to transfer data at the same time. This control circuit, called an arbiter, implements an arbitration scheme in order to provide "fair " access to the bus for each device. The object of the "fair " arbitration is to provide access to the bus for all devices when the device needs access without creating too long a delay which would keep other devices from obtaining access. The information needed to ascertain the maximum latency or time within which the device is allowed to transfer its data, is contained within a configuration register in each bus master. The actual arbitration is hidden and occurs while another bus transaction is going on, so that the next bus master can begin its transfer as soon as the ongoing transfer has been completed.

Figure 1:
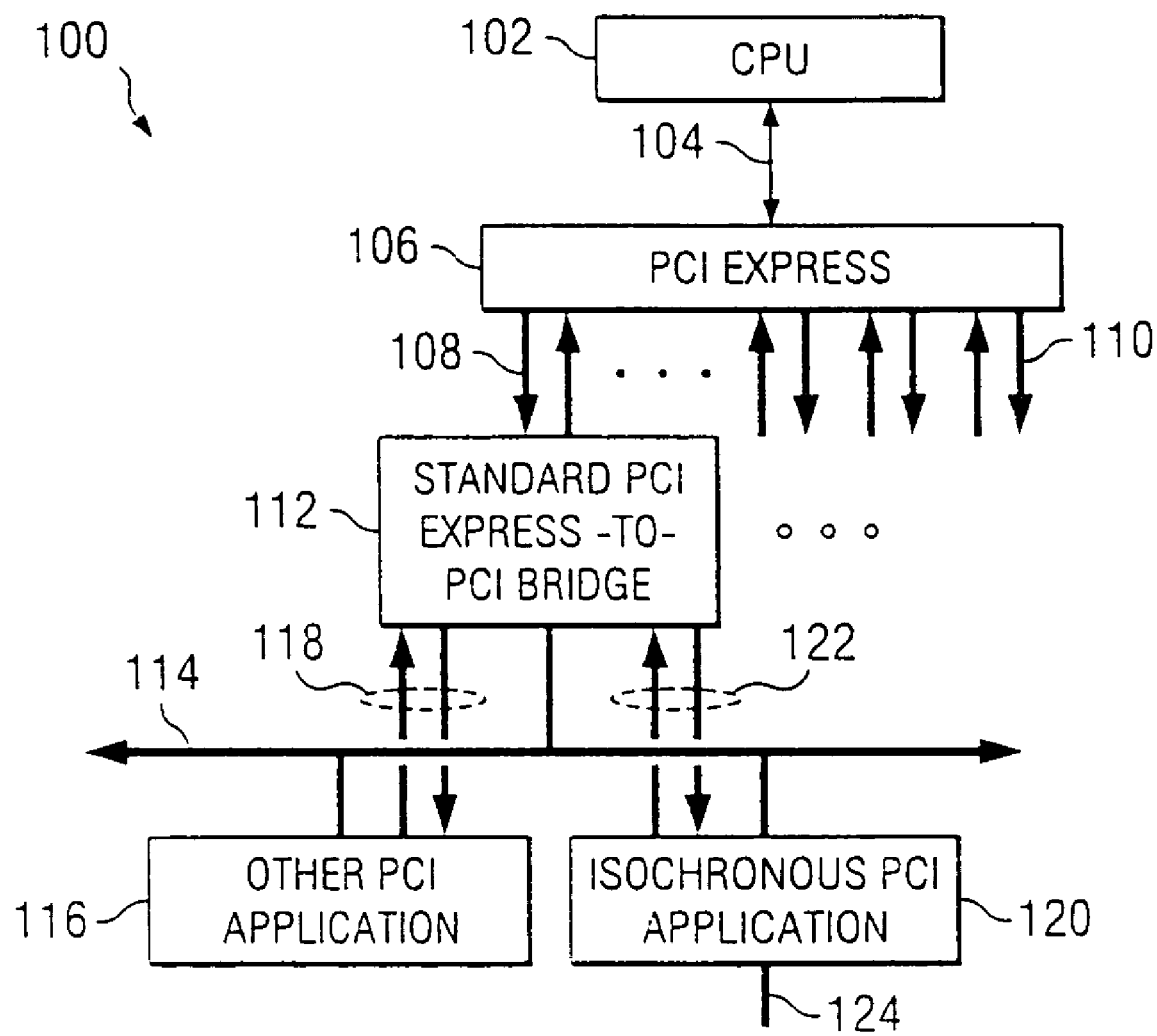
FIG. 1 shows a block diagram of a computer system implementing a standard PCI Express to PCI bridge.
Figure 2:
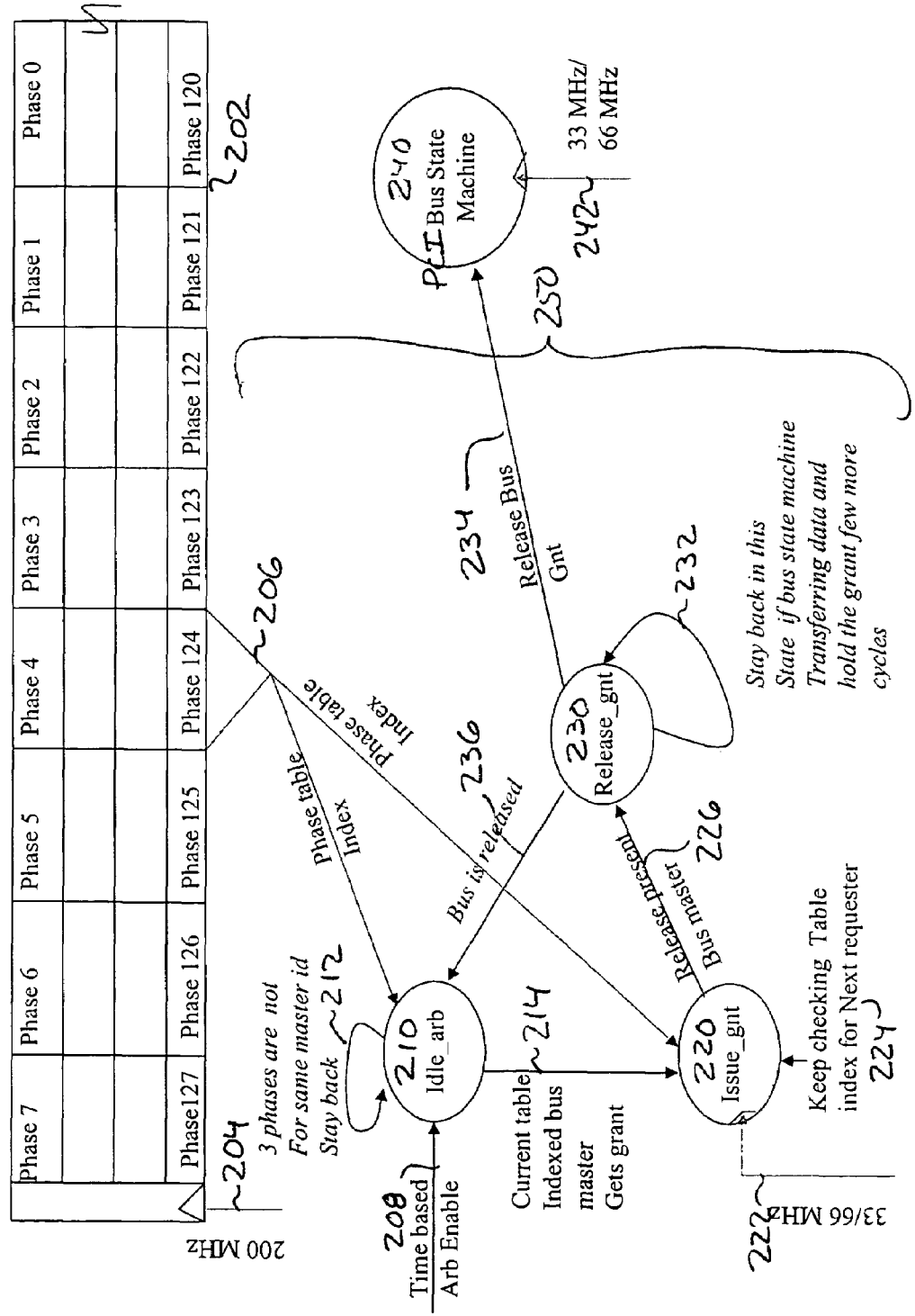
FIG. 2 shows the PCI bus arbiter of the present invention implemented as a state machine.

FIG. 2 shows a PCI bus arbiter capable of supporting isochronous traffic flow generally as 200. The arbiter consists of a phase table 202 and a state machine 250. The phase table 202 contains 128 phases labeled 0-127 each of which contains the identification of a PCI device number which is assigned to that phase. In the implementation shown in FIG. 2, up to sixteen (16) PCI devices are provided for by making each phase table entry 4-bits wide. Table 1 shows an implementation of five (5) PCI devices and a PCI master state machine which contains the PCI bus arbiter as an example implementation.

TABLE 1

| Port Number | GNT# | PCI Device |
|---|---|---|
| 0000b | PCI master state machine | — |
| 0001b | GNT#0 | 0 |
| 0010b | GNT#1 | 1 |
| 0011b | GNT#2 | 2 |
| 0100b | GNT#3 | 3 |
| 0101b | GNT#0 4 | 4 |

In Table 1, we see that each device has its own port number and that all devices except for the PCI master state machine have a device number and a grant number.

In the PCI arbitration scheme, once an arbiter grants a device access the bus, the devices grant number signal GNT# is asserted. This causes the device to monitor the state of the FRAME # and ROY # signals which indicate when the bus is free. If the grant number signal is still asserted when the bus is free, the device initiates its transaction. Each phase or time slot in the phase table 202 contains the port ID for the port assigned to that phase. Once the phase table has been populated to the port assigned to that time slot, the arbiter can be operative. After the time-based arbitration signal on line 208 is enabled, the arbiter state machine enters the Idol_Arb state 210. In this state, the arbiter state machine looks ahead 3 phases in the phase table by means 206. If the arbiter state machine sees that at least 3 consecutive phases are programmed with the ID of a new bus master, it will select that new bus master as the next bus master to use the PCI bus. Once the decision is made to select a new bus master, the arbiter state machine will move along path 214 to the Issue_gnt state 220. If the next 3 phase are not programmed for the same bus master identification, the arbiter state machine follows path 212 and remains in the Idle_Arb state 210 until the next 3 phases are programmed with the same bus master identification.

In state 220, the arbiter state machine continues to monitor the next 3 phases in the phase table 202. Whenever this "look-ahead" phase index determination indicates that a new bus master phase is approaching, the arbiter state machine will move from the Issue_gnt state 220 along path 226 to the Release_gnt state 230. In this state, the transition from one bus master to another can occur. In order to make this determination, the state machine looks at a configuration register stored in the bus master that currently controls the bus. An exemplary 16-bit configuration register is shown in Table 2.

TABLE 2

| Bit | Field Name | Description |
|---|---|---|
| 15:3 | Reserved | |
| 1 | PORTARB_LEVEL_2_EN | 0 - behaves like levell_en<br>1 - "aggressive mode" in this case arbiter will stop secondary bus master in the middle of the transaction to preserve isochrony Traffic |
| 2 | PORTARB_LEVEL_1_EN | 0 - normal<br>1 - 128 phase based port arbiter. |

TABLE 2-continued

| Bit | Field Name | Description |
|---|---|---|
| 0 | Isoc Enable | It will assert grant according phase table programmed as described.<br>0 - Doesn't map upstream traffic to any Virtual Channel other than Virtual Channel 0<br>1 - maps upstream to traffic different virtual channels |

In table 2, bits 1 and 2 determine how the arbiter will act. If bit 1 is set to a one, the 128 phase time-based port arbiter (the present invention) will be operational. If this bit is set to a zero, the arbiter functions as a normal PCI bus arbiter using "fair " arbitration scheme. If bit 2 is set to a zero, the arbiter will make a normal transition from one bus master to another. If bit 2 is set to a 1, the arbiter will enter an "aggressive mode" in which case the first bus master will be stopped in the middle of a transaction to preserve the isochrony of traffic on the bus, which is discussed below.

Each bus master on the PCI bus has a configuration register which is a maximum latency timer register for that device. Each bus clock decrements the register by 1. If an arbiter wants to allow another device to access the bus, it removes the GNT # signal from the current bus master. If the latency register is zero or less when the grant signal is removed, the device has had its minimum guaranteed period of access and must then complete the data cycle and immediately relinquish control of the bus. If the value of the register is positive, however, the device may continue with its transfer until the register value reaches zero, when it must release a bus for the next device.

If bit 2 is programmed with a zero, once the bus state machine has determined that a new bus master will take control of the bus, the machine proceeds via line 226 to the release_gnt 230 in which case the grant signal for the bus master is released. The arbiter state machine stays on path 232 waiting for the current bus master to finish its transaction. Then the arbiter state machine proceeds along path 236 back to the Idle_Art state 210.

If, however, bit 2 is programmed with a 1, the arbiter state machine still proceeds along path 234 to PCI bus state machine 240. Once in this state, the PCI arbiter state machine will reset the internal latency timer register of the active bus master which in turn causes the PCI bus to be released immediately within 1 or 2 clock cycles. This allows a new bus master to take control of the bus. This allows the preservation of the isochrony of data to be transferred by the new bus master, which data can not wait until the present bus master has completed its transaction.

Once the action is determined by the arbiter state machine 250, the action is transmitted along path 234 to the PCI bus state machine 240. The PCI bus state machine 240 is a separate state machine from the arbiter state machine. It is connected to the PCI bus and generates the signals on the PCI bus, such as those shown in FIG. 3, in accordance with the PCI bus standard, in order to transfer access to PCI bus from one bus master to another. Path 234 is not an arbiter state machine 250 path, so that control of the arbiter state machine 250 does not go to the PCI bus state machine 240. Control of the arbiter state machine 250 proceeds along path 236 from state 230. Thus, there is no need for a "return path" from state 240, because path 236 couples control signals to an independent state machine, the PCI bus state machine 240. It should be noted that although the clock signal is only shown going to states 220 and 240, it is also coupled to the other states, but has been omitted for clarity of illustration. Each segment of the phase table 202 represents a 100 Nsec time slot. Therefore, a 10 MHz clock is needed. In the present implementation, a 200 MHz clock signal was available and is divided down to generate the phase table clock. The remainder of the arbiter state machine and the PCI bus state machine operate at the 33 or 66 MHz PCI bus clock.

FIG. 3 shows the operation of the present invention for 3 PCI bus MH$_z$ masters, in addition to the arbiter, on a PCI bus. As shown, the grant signals GNT_0, GNT_1, and GNT_2 are sequentially asserted by the PCI bus state machine by pulling the grant line low in order to grant permission to devices zero, one and two to utilize the PCI bus.

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. A PCI bus time-based weighted round robin arbiter comprising:
   a phase table comprising a plurality of phases, each of the phases being assigned to a port on a PCI bus;
   an arbiter state machine coupled to the phase table for looking at a plurality of phases at a time, the arbiter state machine selecting the next bus master to use the PCI bus when a predetermined number of phases have been assigned to a single port wherein the arbiter state machine sends a signal to PCI bus state machine to terminate a bus transaction within 2 clock cycles in order to allow one of a plurality of devices on the PCI bus to take over control of the bus from another of the plurality of devices on demand in order to preserve isochrony of data from the one device.

2. The PCI bus time-base weighted round robin arbiter of claim 1 wherein the arbiter state machine looks ahead at the port assigned to upcoming phases.

3. The PCI bus time-based weighted round robin arbiter of claim 1 wherein the predetermined number of phases is 3.

4. The PCI bus time-based weighted round robin arbiter of claim 2 wherein the predetermined number of phases is 3.

5. The PCI bus time-based weighted round robin arbiter of claim 1 wherein the plurality of phases is 128.

6. The PCI bus time-based weighted round robin arbiter of claim 2 wherein the plurality of phases is 128.

7. The PCI bus time-based weighted round robin arbiter of claim 1 wherein each of the phases determine a time-based slot for a bus transaction.

8. The PCI bus time-based weighted round robin arbiter of claim 7 wherein each of the phases determine a time-based slot for a bus transaction.

9. In a PCI bus arbiter, arbiter means for guaranteeing a predetermined time for transmitting isochronous data comprising:
   means for dividing a time cycle into a predetermined number of phases, each of the phases being assigned to a port on a PCI bus;
   an arbiter state machine responsive to the means for dividing for granting the use of the PCI bus to a selected port wherein the arbiter state machine sends a signal to PCI bus state machine to terminate a bus transaction within 2 clock cycles in order to allow one of a plurality of devices on the PCI bus to take over control of the bus from another of the plurality of devices on demand in order to preserve isochrony of data from the one device.

10. The arbiter means of claim 9 wherein the means for dividing comprises a phase table having the predetermined number of phases.

11. The arbiter means of claim 9 wherein the arbiter state machine looks ahead to determine when a change of a bus master is imminent.

12. The arbiter means of claim 9 wherein the predetermined number of phases is 3.

13. The arbiter of claim 10 wherein the predetermined number of phases is 3.

14. The arbiter of claim 9 wherein the plurality of phases is 128.

15. The arbiter of claim 10 wherein the plurality of phases is 128.

16. The arbiter of claim 9 wherein each of the phases determine a time-based slot for a bus transaction.

17. A method of operating a PCI bus comprising:
   providing a time-based arbiter for assigning each device on the bus a predetermined time also in which to perform bus transactions;
   terminating a bus transaction within 2 clock cycles for one device on the bus in order to allow another one of the devices on the bus on demand to take over control of the bus to guarantee isochrony of data being transferred for the another one of the devices on the bus.

* * * * *